Dec. 16, 1969  O. PAELIAN ET AL  3,483,741

FORCE MEASUREMENT SYSTEM

Filed Aug. 8, 1967  2 Sheets-Sheet 1

Owen Paelian
Donald R. Rister,
INVENTORS.

BY
*C. A. Phillips*
ATTORNEY.

Owen Paelian
Donald R. Rister,
INVENTORS.

BY
C. A. Phillips
ATTORNEY.

United States Patent Office 3,483,741
Patented Dec. 16, 1969

3,483,741
FORCE MEASUREMENT SYSTEM
Owen Paelian, 1315 Woodmont Ave. SE. 35801, and
Donald R. Rister, 3901 Williamsburg Drive NW.
35810, both of Huntsville, Ala.
Filed Aug. 8, 1967, Ser. No. 659,072
Int. Cl. G01l 5/12, 7/06, 9/00
U.S. Cl. 73—141
12 Claims

ABSTRACT OF THE DISCLOSURE

A force or pressure measurement system in which forces are transmitted through a torus shaped diaphragm and the force output is sensed by a readout device in engagement with the diaphragm.

---

This invention relates to pressure or force measurement systems and particularly to such systems wherein an expansible diaphragm is employed as an element in the force train.

Expansible diaphragms are employed in a number of pressure systems, and in force measurement systems in general where mechanical forces are translated into gas or liquid pressures as a stage in the transmission of these forces from one point to another. However, it has been found that in conventional systems employing conventional diaphragm elements that such systems often fail to provide accurate and rugged means for pressure and force measurements. One such instance is in the measurement of the vertical component of a force which force is only obliquely available for measurement. Another, and an extremely important application where improvement is needed is in instances where small differences in pressure must be determined between two pressures ($P_1P_2$) wherein the two pressures are of a very high value.

It is thus an object of the present invention to provide improvements in systems employing diaphragm elements for the resolution of force components and for the elimination of certain unwanted force components which tend to create inaccuracies in measurement of a particular component of interest.

It is a further object of the invention to provide a sensitive and accurate pressure, or other force, measurement or weighing system.

It is a further object of the invention to provide an extremely accurate and rugged force measurement system for resolving small differences between high pressures.

It is a still further object of the invention to provide improved means for generally translating forces through a diaphragm for accurate measurement, indication and control purposes.

In accordance with the invention a force measurement or indication system is constructed employing a torus or toroidal shaped diaphragm. A force to be examined or further treated is applied in the form of a pressure to the inside of the diaphragm and/or in the form of a pressure or pressures to the exterior of the diaphragm or in the form of a solid force applied to a central portion of an outside surface of the diaphragm. Force output is registered by measuring the deflection of an otherwise undeflected side of the diaphragm.

As a further feature of the invention, means are provided for a weighing or force measurement system wherein the system includes the coupling of forces to be measured through a torus element to a load cell or electrical weighing apparatus wherein, for example, a beam assembly is deformed as a function of applied force and the deformation electrically indicated by means of strain gauges coupled to the beam assembly. Such a load cell or weighing apparatus is disclosed in Thurston Patent 2,488,349.

Figure 1:
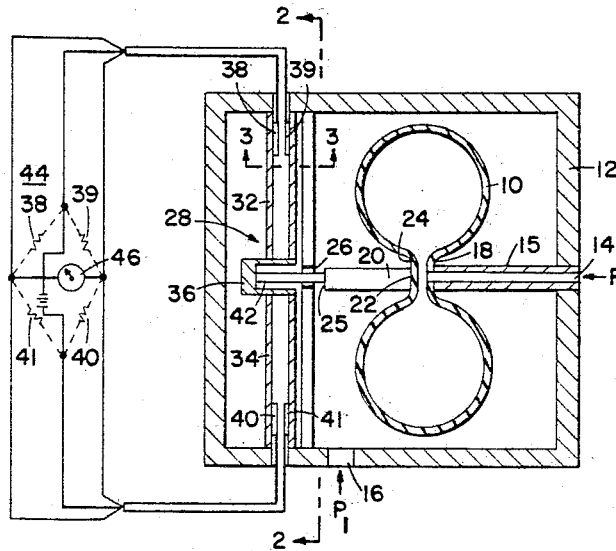
Figure 2:
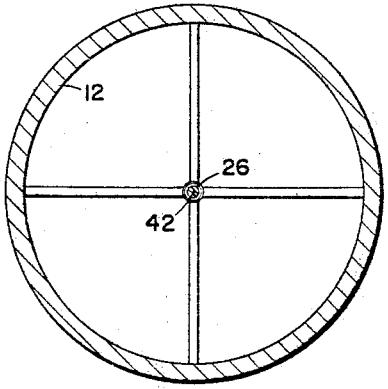
Figure 6:
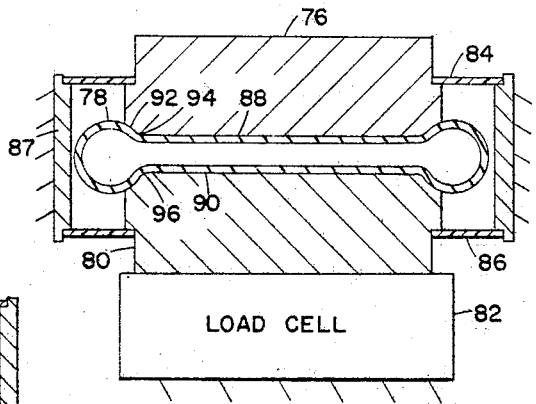
Figure 3:
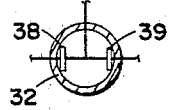
Figure 7:
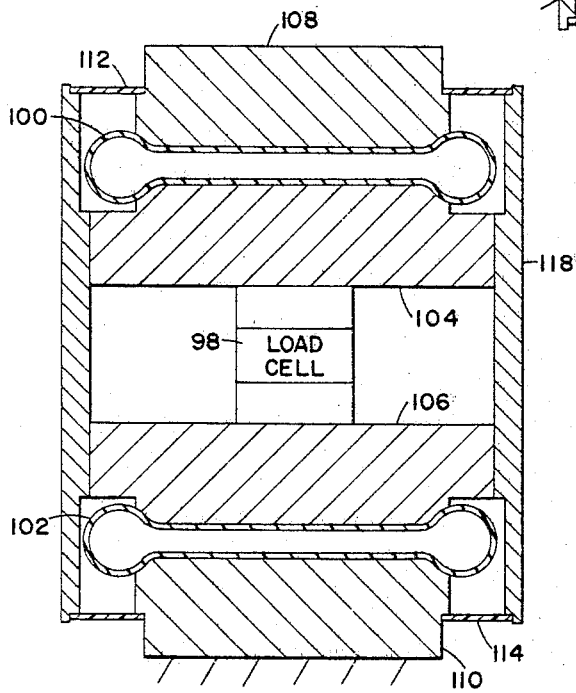
Figure 4:
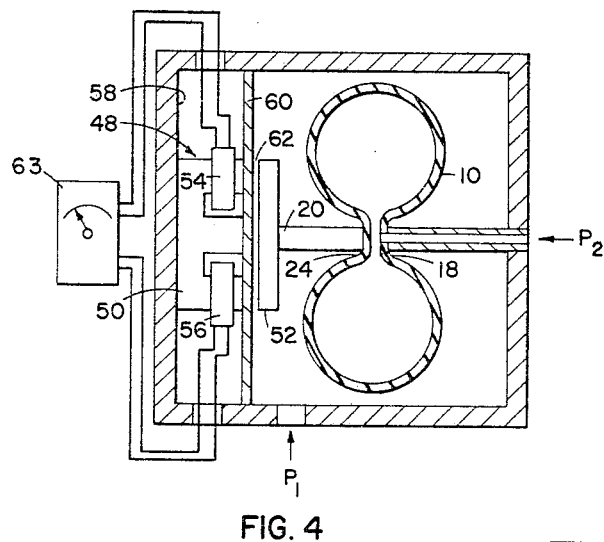
Figure 5:
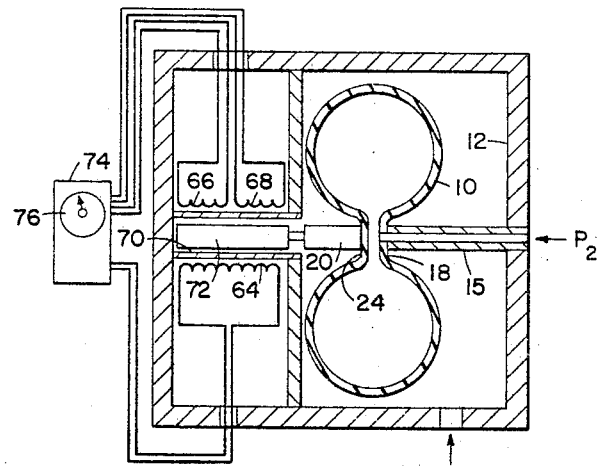
Figure 8:
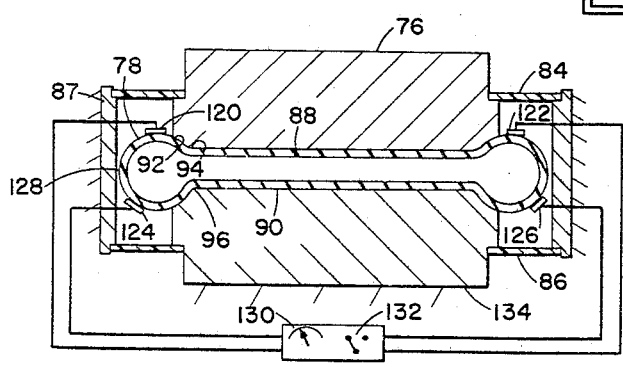

These and other objects, features, and advantages of the invention will become more apparent from the following description when considered together with the drawings in which:

FIGURE 1 is a sectional view of a pressure transducer;
FIG. 2 is a sectional view as seen along lines 2—2 of FIG. 1;
FIG. 3 is a sectional view as seen along lines 3—3 of FIG. 1;
FIGS. 4 and 5 show alternate embodiments of pressure transducers;
FIG. 6 is a sectional view of a weighing system employing a single torus element;
FIG. 7 is a sectional view of a weighing system employing a dual arrangement of torus elements; and
FIG. 8 is a sectional view of still another weighing system.

Referring now to the drawings, and particularly to FIGS. 1–3, torus or torus element 10 is positioned within an enclosure 12 and a first port 14 connects to the interior of torus element 10 and a second port 16 connects to the interior of enclosure 12. Port 14 includes a rigidly mounted tube 15 between housing 12 and torus element 10 which provides a rigid support for the central planar portion 18 of one side of the torus. Output force coupling arm 20 is positioned with one end 22 contacting or connected to the central planar portion 24 of the opposite side of the torus. The opposite end of arm 20, subject to limit stop 26, operates load cell assembly 28.

Load cell assembly 28 employs a first tubular loading beam 32 and a second tubular loading beam 34, beam coupling member 36, and strain guages 38, 39, 40 and 41 which are attached to the interior of beams 32 and 34 to register flexure imposed by beam coupling member 36 on each beam. The ends of the beams are rigidly connected at one end to housing 12 and at the other end to beam coupling member 36. Upon a change of force being applied by end 25 of arm 20 to center arm 42 of beam coupling member 36, the beams are caused to deform as a function of applied force and the resulting deformation of the beams is electrically indicated by the change in electrical resistance of variable resistance strain gauges 38–41. By connecting the strain gauges in an electrical resistance bridge circuit 44, illustrated in dashed lines, each strain gauge representing a resistor which varies in resistance with strain, the deformation of torus 10, either as an expansion or contraction, can be readily detected and readout by meter 46, connected as a potentiometer in bridge circuit 44, and appropriately calibrated.

In operation, a first pressure $P_1$ would be applied by appropriate means to port 16 and for purposes of illustration we will assume a pressure of approximately 5,000 p.s.i. Then, for example, assume a pressure of approximately 5,005 p.s.i. is applied as $P_2$ to port 14. The result will be that torus 10 will expand as a function of the difference in pressure between $P_1$ and $P_2$. The expansion causes load cell assembly 28 to be operated by a deflection to the left of beam coupling member 36. As a result, beams 32 and 34 are deformed and the resultant deformation is indicated as a differential pressure by meter 46 responsive to changes in resistance of strain gauges 38–41. For example, the resistance of gauges 38 and 40 would increase and the resistance of gauges 39 and 41 would decrease. If contraction of torus 10 is induced an opposite change would occur.

The sensitivity to deflection of torus 10 and load cell assembly 28 is dependent upon the deflection characteristics of these units. Limits for a particular unit are determined by the distance between planar walls 18 and 24 of torus 10 with respect to contraction of torus 10, and the distance between arm 28 and limit stop 26 as to expansion of torus 10. By appropriate selection of these dimensions and the deflection characteristics of torus 10 and load cell assembly 28 measurement systems can be constructed to cover most any desired range of operation and ranges of a given unit may be readily changed by changing the torus sensing elements. In this fashion a single basic unit may be used to measure pressures up to on the order of 6,000 p.s.i. or more.

In addition, and this has been found to produce tremendous savings in equipment life, the system is virtually fool-proof in operation in that it will not be destroyed if the operating range of the system is significantly exceeded. For example, assume that in the example discussed above the pressure referred to as $P_1$ suddenly failed and $P_1$ is reduced to zero. This would place on the system a differential pressure of approximately 5,005 pounds instead of 5 pounds. Normally with most instruments this would destroy it. Here, however, the only effect would be that arm 20 would move out to the left until it reached limit stop 26 where it would be restrained. Conversely, if $P_2$ should fail, the result would be that torus element 10 would contract until walls 18 and 24 came in contact preventing further deformation of the torus. Normal operation would be resumed simply by re-application of the lost pressure. This nondestructive capability is believed to be unique in the field of high pressure, small differential, measurement devices. As illustrated in FIG. 4, stop 26, supported by housing 12, permits an expansion of diaphragm 10 substantially equal to permitted contractions of diaphragm 10, the distance of expansion or contraction, thus being equal to the distance between the inner surfaces of the planar portion of diaphragm 10 whereby equal extreme limits can be provided for the electrical readout system, in this case load cell assembly 28.

Of course the system of FIGS 1-3 may be employed to measure a single pressure in which case $P_1$ or $P_2$ would be made the reference, either absolute zero or atmospheric pressure, and the pressure to be measured applied as the other pressure.

As still another feature of the invention the load cell assembly 28 uniquely seals off the strain gauges from the atmosphere within housing 12. This is accomplished by mounting strain gauges 38-41 within tubular members 32 and 34. By virtue of the isolation thus achieved, the measurement system is not limited as to the nature of the gases which are applied to port 16 for measurement and, for example, the system will readily handle such corrosive materials are liquid oxygen which normally would be most destructive to the strain gauges.

Where noncorrosive atmospheres are involved load cells employing beam construction as shown in Patent 3,272,006 may be employed.

Referring now to FIG. 4, the pressure transducer shown therein differs from that of the one shown in FIG. 1 in that a unique variable reluctance assembly 48 provides electrical sensing of expansion and contraction of torus element 10 with changes in differential pressure $P_1-P_2$. In this form of the invention variable reluctance assembly 48 consists of E-shaped magnetic core 50, movable magnetic core 52 and coils 54 and 56. Movable core 52 is within housing 12 and core 50 is adjacent in housing 58, the cores being separated by non-magnetic stainless steel barrier 60 and an air gap 62 between core 52 and barrier 60. Core 52 is mounted on arm 20 and air gap 62 is adjusted to permit travel of core 52 within desired limits as dictated by the range of expansion and contraction of torus element 10. Thus barrier 60 provides a physical stop to limit expansion of torus element 10. Contraction is limited by the closing together of walls 18 and 24 of torus element 10. Deformation of torus element 10, as with change in $P_1-P_2$, is read-out by a reactance meter assembly 63 appropriately calibrated to translate reactance values of variable reluctance assembly 48 to differential pressure values.

FIG. 5 shows still another form of pressure transducer wherein read-out is accomplished by a new and improved differential transformer assembly having a torus driven movable transformer core. In this pressure transducer, differential transformer input winding 64 and output windings 66 and 68 are wound about nonmagnetic stainless steel elongated tubular shield 70 which separates and isolates the windings from housing 12. The output windings extend, respectively, into opposite end regions of the tubular shield and the input winding is basically centered with respect to the output windings and thus is in a balanced position with respect to the output windings. Movable magnetic core 72, coupled to arm 20, is moved with the expansion of torus element 10 along a line of direction corresponding to the longitudinal axis of shield 70 to either increase the coupling between windings 64 and 66 and decrease the coupling between windings 64 and 68, indicating the expansion of torus element 10 or, decrease coupling between windings 64 and 66 and increase the coupling between windings 64 and 68 to indicate a contraction of torus element 10. The position of core 72 thus provides means of giving a quantitative indication of pressure, and precise read-outs either in the contraction or expansion direction can be indicated by polarizing the outputs of windings 66 and 68 and connecting them oppositely in comparator circuits 74 with electrical meter 76.

Still other techniques of deflection indication may be used as, for example, variations in electrical capacitance of two metal surfaces appropriately positioned to be relatively moved in response to torus deflection.

Referring now to FIG. 6, a force measurement or weighing asembly is shown wherein oblique forces are isolated and eliminated permitting very accurate weighing of objects where such oblique forces would otherwise create significant inaccuracies. A force to be weighed is applied to weighing or force coupling platform member 76, and then through torus or torus diaphragm element 78 to a second force coupling platform 80 and then to load cell 82 from which weight is read-out through conventional electrical means (not shown). Load cell 82 is supported on a fixed base, not shown. Platforms 76 and 80 are generally centered by virtue of corrugated or plane flexible diaphragms 84 and 86 held by a surrounding circular support 87 which serve to coarsely remove oblique forces and torus element 78 then serves to finally reduce oblique forces to insignificant values. This leaves only or nearly only vertical forces to be transmitted to the load cell permitting extremely accurate weight measurements. Force platforms 76 and 80 basically engage the central planar portions 88 and 90 of torus element 78 but overlap the outer circular cross-sectional portions 92 slightly in order to remove or relieve pressures at bends 94 and 96 which would otherwise have a tendency to rupture upon the application of very high forces. The spacing between planar sides 88 and 90 of torus element 78 is made extremely small with respect to the cross section of the outer circular portions and typically is a few thousandths of an inch.

FIG. 7 shows still another embodiment of the invention and in it two sets of torus diaphragm elements are employed to isolate a weighing element from oblique forces. The weighing element load cell 98 is positioned between the torus elements 100 and 102 which are coupled to the load cell by force coupling members 104 and 106, force coupling member 106 supporting load cell 98 on torus element 102, and coupling member 104 supporting torus element 100 on load cell 98. The force train is completed by a top force receiving member 108 which rests on torus element 100, and by bottom force reference or fixed base member 110 which supports torus element 102. Again, as in the case of the assembly of FIG. 6, each member which rests on or supports a torus element is basically engaged by a planar portion of the torus element but, and this is very important, there is provided some overlap with the outer enlarged portion of the torus element to extend the point of force discontinuity beyond the junction of the planar portion of the torus element and the outer portion of the torus element. Corrugated or otherwise flexible diaphragms 112 and 114 generally stabilize the assembly, with diaphragm 112 centering force receiving member 108 and a similar diaphragm 114 centering force reference or fixed base member 110 with respect to the balance of the assembly. In both instances the diaphragms are positioned concentrically by virtue of a cylinderical support 118 which serves as a base or reference support for diaphragms 100 and 102.

FIG. 8 illustrates a force measurement or weighing assembly wherein force sensing is accomplished in a unique manner by affixing strain gauges 120, 122, 124, and 126 directly to the outer circular portion of torus element 78. Strain gauges 120 and 122 illustrate the position of gauges near the most sensitive measurement position, adjacent bend 94, and thus a maximum distance from the periphery 128 of torus element 78. Strain gauges 124 and 126 are positioned in less sensitive regions farther removed from bend 94. In this manner gauges 120 and 122 are positioned to provide their full range of change in electrical characteristic with less change in pressure on torus element 78 than are gauges 124 and 126, making possible the use of a single torus element employing multiple gauges to cover two or more spaced or overlapping measurement ranges. This multiple measurement capability is illustrated by the connection of strain gauges to electrical readout unit 130 which would in a conventional manner indicate changes in electrical characteristics, such as resistance, of the strain gauges and which includes a range switch 132 to switch between gauges 120 and 122, acting together, and gauges 124 and 126. While gauges 120 and 122 are illustrated as being operated together to provide a single range of measurement, a different number, more or less, may be used to form any desired configuration of output circuit, e.g. a bridge or potentiometer circuit. Other than as just described, the assembly shown in FIG. 8 is similar in overall configuration to that shown in FIG. 6 and the system achieves electrical weighing of objects placed on platform 76, the weight being read-out on read-out unit 130. Load cell 82 is replaced by supporting base 134.

What is claimed is:
1. A force translation system comprising:
   (A) a circular diaphragm comprising an outer annular region and inner region and wherein:
      (1) the walls of said inner region are planar;
      (2) the outer annular region is of a circular cross-section; and
      (3) the natural mode spacing between said walls of said inner region is small with respect to the said circular cross-section of said outer annular region;
   (B) force application means coupled to said diaphragm for producing an increase in internal pressure in said diaphragm;
   (C) force receiving means contacting one of said walls of said inner region of said diaphragm; and
   (D) force indication means coupled to said diaphragm for indicating the force presented to said diaphragm, said force indication means including at least one strain gauge affixed to the surface of said outer angular region of said circular diaphragm and spaced a predetermined distance along the surface of said diaphragm from the periphery of said diaphragm.

2. The force translation system set forth in claim 1 further comprising a plurality of said strain gauges and wherein at least two of said strain gauges are spaced at different distances along the surface of said diaphragm from the periphery of said diaphragm and including means connected to said differently spaced strain gauges for indicating different magnitude forces presented to said diaphragm.

3. A force translation system comprising:
   (A) a circular diaphragm comprising an outer annular region and inner region and wherein:
      (1) the walls of said inner region are planar;
      (2) the outer annular region is of a circular cross-section; and
      (3) the natural mode spacing between said walls of said inner region is small with respect to the said circular region;
   (B) force application means coupled to said diaphragm for producing an increase in internal pressure in said diaphragm, said force application means comprising means for applying a force to the outside of one of said walls of said inner region;
   (C) force receiving means contacting the opposite of said walls of said inner region of said diaphragm; and
   (D) force indication means coupled to said force receiving means for indicating the force presented to said diaphragm in a direction normal to a said planar wall.

4. The force translation system set forth in claim 3 wherein said force application means comprises a cylindrical member having an end in engagement with a said planar wall of said circular diaphragm and a portion of said outer annular region of said diaphragm.

5. The force translation system set forth in claim 4 further comprising an annular outer supporting member and annular flexible diaphragm, said diaphragm being positioned between and interconnecting said cylindrical member of said force application means and said annular outer supporting member.

6. The force translation system set forth in claim 5 wherein said force receiving means comprises a second said cylindrical member having an end in engagement with a planar wall opposite to said first named planar wall of said diaphragm and in engagement with a portion of said outer annular region of said diaphragm.

7. The force translation system set forth in claim 6 further comprising a stabilized force stand comprising:
   (A) a second said circular diaphragm;
   (B) third and fourth said cylindrical members being positioned, respectively, on opposite sides of said second circular diaphragm and each being in engagement with a said planar portion and a portion of the outer annular region of said second circular diaphragm
   (C) means for supporting said force indication means on said third cylindrical member; and
   (D) a second said annular diaphragm interconnecting said fourth cylindrical member and said annular outer supporting member.

8. A force translation system comprising:
   (A) a circular diaphragm comprising an outer annular region and inner region and wherein:
      (1) the walls of said inner region are planar;
      (2) the outer annular region is of a circular cross-section; and
      (3) the natural mode spacing between said walls of said inner region is small with respect to the said circular region;
   (B) force application means coupled to said diaphragm for producing an increase in internal pressure in said diaphragm, said force application means comprising tubular means connected to the interior of said diaphragm for connecting a first pressure to the inside of said diaphragm and including means for rigidly supporting in a fixed position one of said walls of said inner region;
   (C) force receiving means contacting the opposite of said walls of said inner region of said diaphragm;
   (D) force indication means coupled to said diaphragm for indicating the force presented to said diaphragm in a direction normal to a said planar wall comprising:
(1) first and second deflectable tubular beams, one end of each beam being fixed in space;
(2) a U-shaped member, the free end of one said beam being connected to one leg of said U-shaped member and the free end of the other said beam being connected to the opposite leg of said U-shaped member;
(3) said force receiving means includes coupling means interconnecting the center portion of said U-shaped member to said force receiving means;
(4) a pair of electromechanical elements positioned on the inside of each said tubular beam and each said element including means responsive to the deformation of the beam for providing an electrically detectable condition which varies as a function of beam deformation; and
(5) an electrical bridge circuit wherein said electromechanical elements comprise the legs of the bridge and further including read-out means connected to the output of the bridge for indicating the magnitude of force applied to said force indication means;
(E) a housing enclosing said diaphragm and further comprising means for coupling a second pressure to the inside of said housing.

9. A force translation system comprising:
(A) a circular diaphragm comprising an outer annular region and inner region and wherein:
(1) the walls of said inner region are planar;
(2) the outer annular region is of a circular cross-section, and
(3) the natural mode spacing between said walls of said inner region is small with respect to the said circular region;
(B) force application means coupled to said diaphragm for producing an increase in internal pressure in said diaphragm, said force application means comprising tubular means connected to the interior of said diaphragm for connecting a first pressure to the inside of said diaphragm and including means for rigidly supporting in a fixed position one of said walls of said inner region;
(C) force receiving means contacting the opposite of said walls of said inner region of said diaphragm;
(D) force translation system comprising:
(1) a fixed mounted magnetic core;
(2) an electrical winding on said fixed mounted magnetic core;
(3) a movable magnetic core mounted on said force receiving means and being magnetically coupled to said fixed mounted magnetic core wherein the reluctance to an alternating current passing through said electrical winding is varied as a function of the extension and contraction of said circular diaphragm;
(4) a wall of said housing being of non-magnetic material and separating said fixed mounted core and said movable magnetic core, said fixed mounted core being outside of said housing and said movable core being inside of said housing; and
(5) reactance measurement means coupled to said coil for providing a measurement output representative of the extension and contraction of said one of said walls of said inner region of said diaphragm;
(E) a housing enclosing said diaphragm and further comprising means for coupling a second pressure to the inside of said housing.

10. A differential pressure transducer comprising:
(A) a circular diaphragm comprising an outer annular region and inner region and wherein:
(1) the walls of said inner region are planar;
(2) the outer annular region is of a circular cross-section; and
(3) the natural mode spacing between said walls of said inner region is small with respect to the said circular region;
(B) force application means comprising tubular means connected to the interior of said diaphragm for connecting a first pressure to the inside of said diaphragm and including means for rigidly supporting in a fixed position one of said walls of said inner regions;
(C) force receiving means contacting the opposite of said walls of said inner region of said diaphragm;
(D) force indicating means coupled to said force receiving means for indicating the force presented to said diaphragm in a direction normal to a said planar wall;
(E) a housing enclosing said diaphragm and including means for coupling a second pressure to the inside of said housing; and
(F) limit means supported by said housing for operating with respect to said force receiving means for limiting the travel of said force receiving means, as said diaphragm expands, to a predetermined distance, wherein said diaphragm is protected from destruction in the event of a loss of pressure inside of said housing.

11. A differential pressure transducer as set forth in claim 10 wherein said force indication means comprises a load cell, said load cell including at least one beam connected to said force receiving means and electrical means responsive to the deformation of said beam for electrically indicating the expansion and contraction of said diaphragm.

12. A differential pressure transducer as set forth in claim 11 wherein said predetermined distance permitted by said limit means substantially corresponds to the spacing between the inner surfaces of said inner regions of said diaphragm.

References Cited

UNITED STATES PATENTS

| 2,198,192 | 4/1940 | Anderson | 92—92 |
| 2,226,201 | 12/1940 | Freyssinet | 92—92 XR |
| 2,623,386 | 12/1952 | Baker | 73—141 XR |
| 2,657,350 | 10/1953 | Rossire | 73—386 XR |
| 2,868,570 | 1/1959 | Hines et al. | 177—211 XR |
| 3,046,788 | 7/1962 | Laimins | 73—411 XR |
| 3,099,823 | 7/1963 | Bobula et al. | 73—398 XR |
| 3,303,451 | 2/1967 | Yuan | 73—398 XR |

CHARLES A. RUEHL, Primary Examiner

U.S. Cl. X.R.

73—398, 410